April 21, 1964  J. R. DAVIS ETAL  3,129,753
HEATING AND COOLING APPARATUS
Filed April 3, 1959

INVENTOR.
JAMES R. DAVIS
MARCUS C. DOOLITTLE
BY
*Holmes & Andersen*
ATTORNEYS

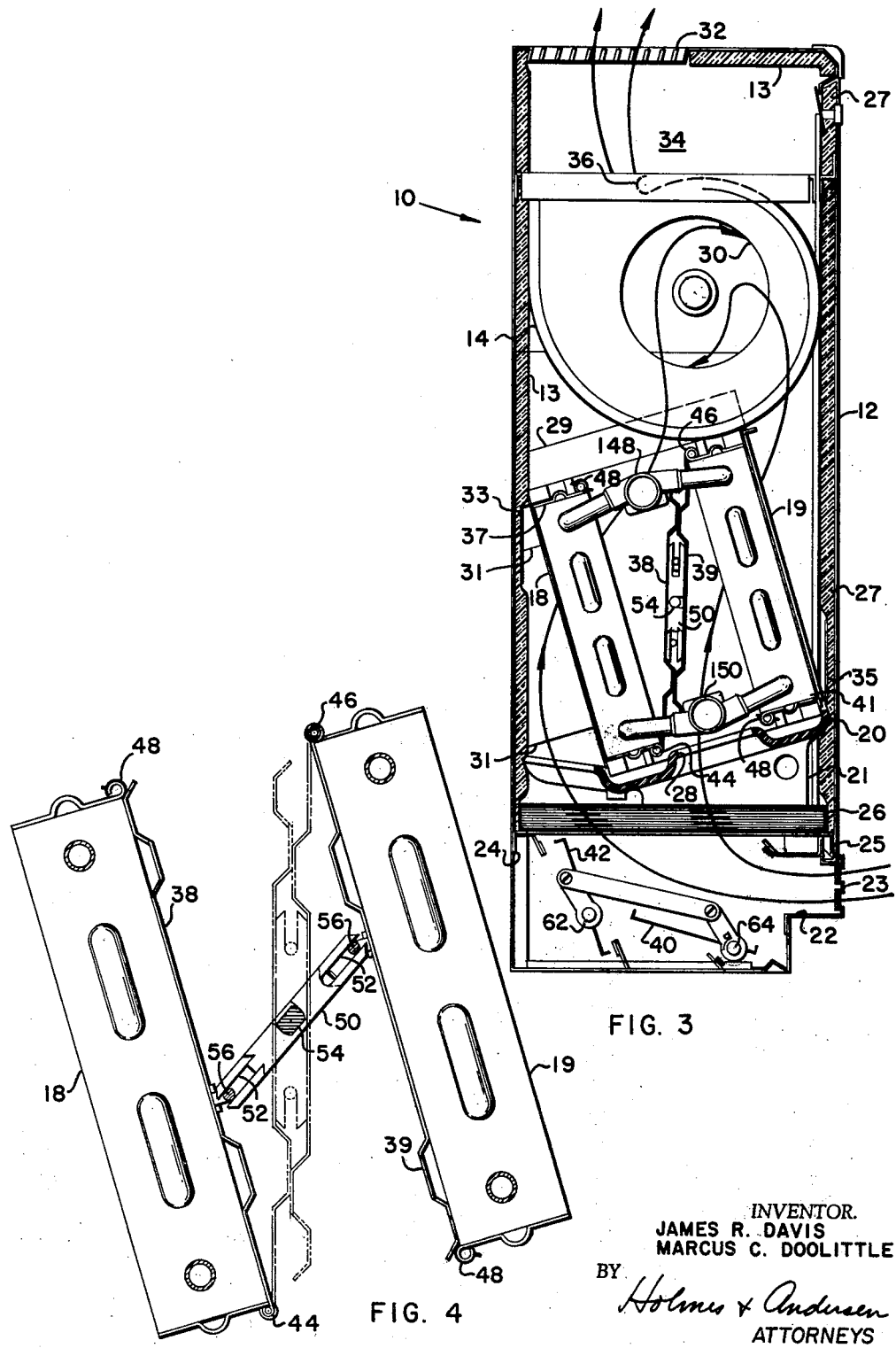

April 21, 1964    J. R. DAVIS ETAL    3,129,753
HEATING AND COOLING APPARATUS
Filed April 3, 1959    4 Sheets-Sheet 3

INVENTOR.
JAMES R. DAVIS
MARCUS C. DOOLITTLE
BY
*Holmes & Andersen*
ATTORNEYS

April 21, 1964 J. R. DAVIS ETAL 3,129,753
HEATING AND COOLING APPARATUS
Filed April 3, 1959 4 Sheets-Sheet 4

INVENTOR.
JAMES R. DAVIS
MARCUS C. DOOLITTLE
BY
*Holmes & Andersen*
ATTORNEYS

United States Patent Office 3,129,753
Patented Apr. 21, 1964

3,129,753
HEATING AND COOLING APPARATUS
James R. Davis and Marcus C. Doolittle, La Crosse, Wis., assignors to The Trane Company, La Crosse, Wis., a corporation of Wisconsin
Filed Apr. 3, 1959, Ser. No. 803,884
3 Claims. (Cl. 165—36)

This invention relates to heating and cooling apparatus which is located in the conditioned space and more particularly to heating and cooling apparatus which has the cooling or heating coils located within the confines of the apparatus while the compressor, chiller, source of cool water, source of heat, etc. is normally located remote from the area conditioned by the heating and cooling apparatus.

Generally, units of this type are located on the outer walls of a room underneath the windows in order to combat the cold air which flows down along the walls and windows in the wintertime. Room air is drawn through the front of the unit and fresh air is drawn through the back of the unit by means of a fan or fans which mixes the fresh and room air, filters the mixture of air, passes the mixture through the heat exchangers, and delivers such conditioned air to the conditioned space in response to certain predetermined conditions. Units of this type are normally used in schoolrooms, hospital rooms, offices, and other areas which require individual control. The basic disadvantage of this type of unit is that it projects too far into the conditioned space thereby using space which could be utilized by the occupant. Another disadvantage of this type of unit is that when outside wind velocities are high, air will blow through the fresh air inlet and through the return air inlet into the room causing unconditioned air to be delivered to the conditioned space.

With these and other disadvantages in mind, it is an object of this invention to provide a heating and cooling unit which is substantially smaller in depth than comparable units.

A second object of the invention is to provide a heating and cooling unit in which blow through of air at high outside air velocities is eliminated.

Another object of the invention is to provide a heating and cooling unit which is small in depth, eliminates blow through of outside air at high outside velocities, and has a damper control system to deliver air at the proper temperature in accordance with the demand of the conditioned space.

A still further object of the invention is to provide a new and novel fresh and return air damper linkage which eliminates blow through of outside air through the heating and cooling apparatus.

A fifth object of the invention is to provide a heating and cooling apparatus which has the filter and drain pan assembly readily accessible to the conditioned space through the front of the unit.

A sixth object of the invention is to provide an efficient and quiet heating and cooling unit which is economical to manufacture.

A still further object of the invention is to provide a heating and cooling unit which has a minimum depth due to a novel heat exchanger and bypass arrangement, eliminates blow through of outside air by means of a new and novel fresh air and return air damper mechanism, and has a control system to control the above apparatus in accordance with the temperature requirements of the conditioned space.

Further objects and advantages of the invention will become apparent from the following specification taken in connection with the drawings which form part of this application, and in which:

FIG. 3 is a section view of one end of the unit shown in FIG. 1 with the bypass, return, and fresh air dampers in the full cooling position;

FIG. 4 is a blown up end view of the heat exchange coils of FIG. 3 with the bypass dampers shown in full cool position in solid lines;

Figures 1, 2:
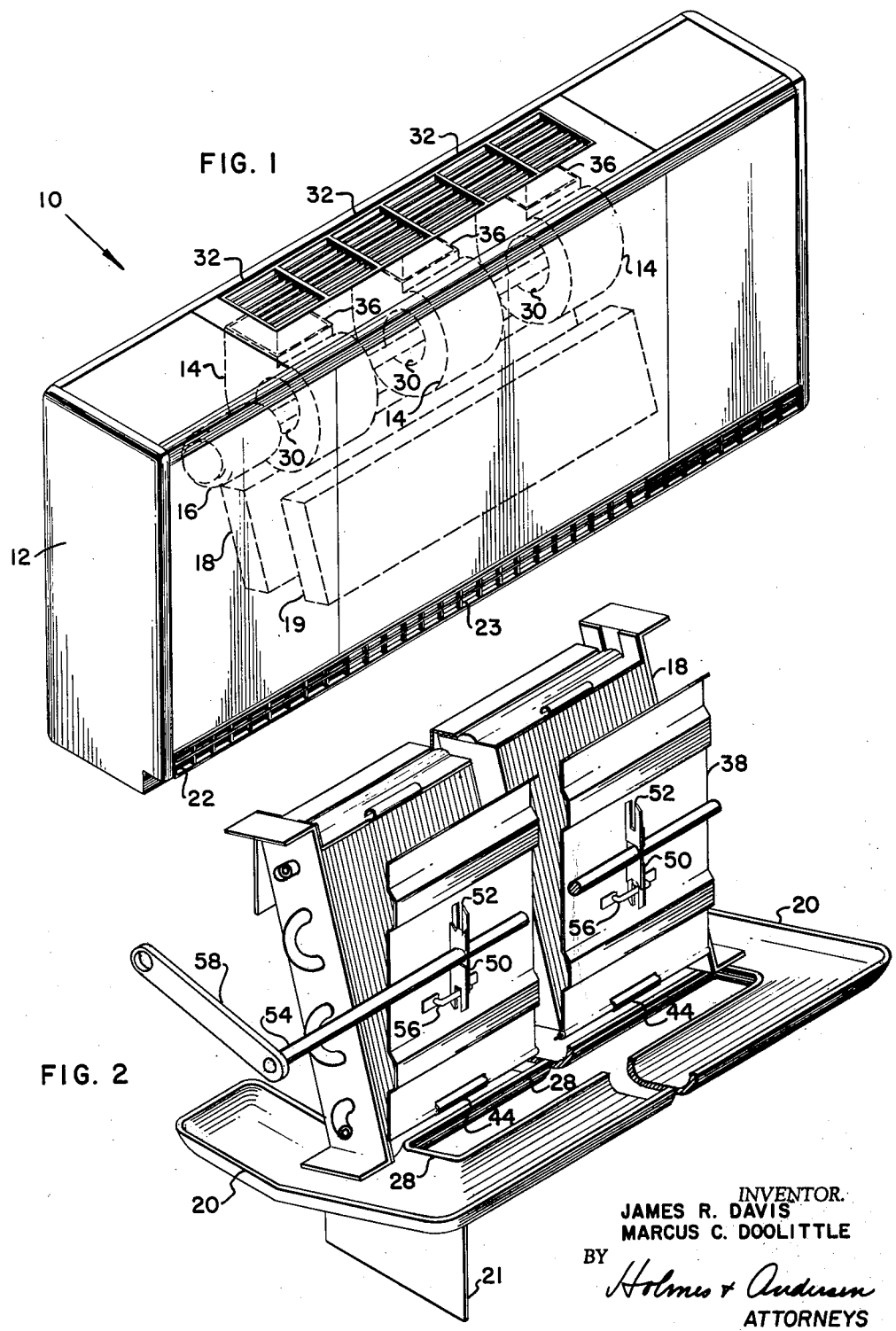
FIG. 1 is a perspective view of the new and improved heating and cooling apparatus.
FIG. 2 is a perspective view of the drain pan and one heat exchanger and associated damper shown in FIGS. 3 and 4.

Referring now to the drawings, the new and novel heating and cooling apparatus is generally denoted by the reference number 10. Heating and cooling unit 10 basically is comprised of a casing 12 insulated in any suitable manner such as by insulation 13, blowers 14, driven by motor 16, heat exchangers 18 and 19, drain pan 20 mounted on feet 21 in the unit 10 in any suitable manner, return air inlet 22 with return grill 23 inserted therein, and fresh air inlet 24. Lateral duct extensions and shelving may also be used in conjunction with this unit, if desired.

Air to be delivered to the conditioned space is drawn in either return air inlet 22 or fresh air inlet 24 or in both simultaneously, through filter 26, through heat exchanger 19, via aperture 28, in drain pan 20, and around drain pan 20, through heat exchanger 18, into blower inlets 30, and discharged through discharge grill 32 which communicates with plenum chamber 34, which in turn communicates with fan discharge outlets 36.

The amount of air passing through heat exchangers 18 and 19 is controlled by bypass dampers 38 and 39. The proportion of fresh air admitted to the amount of return air admitted is determined by the positions of the return air damper 40 and the fresh air damper 42. The operation of these dampers will be explained in greater detail hereinafter.

Drain pan 20 which extends over both ends of the filter 26 is mounted by legs 21 on support bracket 25. Filter 26 is supported on support bracket 25 between the legs 21 of the drain pan and is located between the fresh and return air inlets and the heat exchangers 18 and 19. Front panel member 27 of the heating and cooling apparatus 10 is removably supported in any suitable manner so that the drain pan 20 and the filter 26 are accessible to the conditioned area by merely removing the panel member 27. Obviously, both the drain pan 20 and the filter 25 may be removed through the front of the unit, if desired.

Heat exchangers 18 and 19 are secured in a position parallel to one another and at an angle to a plane parallel to front panel 27 by support member 29 and by channel member 31. Support member 29 extends through the insulation 13 and is bolted or otherwise secured to casing 12. Channel member 31 is secured to the heat exchanger 18 and bears against the insulation 13 to locate the heat exchanger assembly in position. Plates 33 and 35 are provided on diagonally opposite corners 37 and 41 of heat exchangers 18 and 19 and abut the insulation 13 to prevent leakage of air past the heat exchangers and to direct the incoming air through the heat exchangers.

It has been found that our new and novel arrangement of heat exchange coils and bypass dampers provides a unit which has a reduction in depth of unit from front to back of approximately 35% over that of comparable units of the same capacity and air pressure drop. Comparable units of the same capacity and air pressure drop normally provide one two-row heat exchanger with an area adjacent the heat exchanger, either towards the front of the unit or towards the rear of the unit for bypass air which is used when conditioned space requirements are satisfied and only ventilation is required or proportions thereof are to be mixed with the conditioned air. Obviously, with this type of an arrangement when the unit is either on no load conditions or on full load conditions, either the bypass area or the heat exchanger area will not be in use. Looking at FIG. 3, it can be seen that by the provision of a plurality of heat exchangers we are able to provide an area between the heat exchangers which is used to bypass all the air on no load conditions, pass the air required for heat exchanger 19 on full load conditions, and to allow the passage of some bypass air and some air for the heat exchanger 19 on part load conditions. Obviously, this arrangement allows a reduction of depth of the unit since no longer is there an area of non-use in the unit. A further reduction of unit size is accomplished versus comparable units of the same capacity and pressure drop since the splitting of a single coil into a multiplicity of coils reduces the pressure drop across the coils since the air is passed over them in parallel. Since the pressure drop is reduced, the air inlet areas may be decreased to increase the pressure drop up to that of comparable units. When the inlet air areas are decreased naturally, the depth of the unit will be decreased likewise. In our preferred embodiment we have shown only two heat exchangers but obviously the basic concept may be applied to units of larger sizes and a plurality of heat exchangers may be used to reduce the depth of said units in the same proportion.

The air flow through heat exchangers 18 and 19 is controlled by bypass dampers 38 and 39 rotatably secured to the heat exchangers at 44 and 46. Sealing members 48 of felt or any other suitable material are provided to seal the point of engagement between the bypass dampers and the heat exchangers. A series of brackets 50 with U-shaped slots 52 in both ends are secured to damper shaft 54. U-shaped rod or bearing members 56 are attached by welding, brazing, or any other suitable means to each of the bypass dampers 38 and 39 and have their apexes slidably inserted in U-shaped slot 52. Other shaped rod members 56 may be used if desired. Damper shaft 54 is secured to a crankarm 58 which in turn is pivotally secured to a damper motor 60 for reasons which will be set forth later.

Looking at FIGS. 2-4, the operation of the bypass dampers 38 and 39 will be explained. Assuming the dampers are in the position shown in FIG. 3. All the incoming air is being directed through the heat exchange elements 18 and 19. When room conditions are such that unconditioned air is required, crankarm 58 is rotated clockwise by damper motor 60 to rotate damper shaft 54 connected thereto. As damper shaft 54 rotates in the clockwise direction, U-shaped rod members 56 slide along grooves 52 until bypass dampers 38 and 39 reach the position where the passage of air through heat exchangers 18 and 19 is blocked off as shown in FIG. 4 in solid lines. When the bypass dampers have reached this position, the U-shaped rod members 56 are at the outer extremities of slots 52. Conversely, when room conditions are such that cooling or heating is required, damper motor will rotate crankarm 58 in a counter-clockwise direction causing damper shaft 54 to rotate in a counter-clockwise direction. Dampers 38 and 39 will then rotate from the solid line position shown in FIG. 4 to the dotted line position of FIG. 4 where all the incoming air once again passes through the heat exchangers 18 and 19. As above, the U-shaped rod members 56 slide along slots 52 in brackets 50 until the minimum position is reached near the bottom of the slot when the dampers are adjacent one another and all the incoming air is passing over the heat exchangers 18 and 19.

Figure 5:
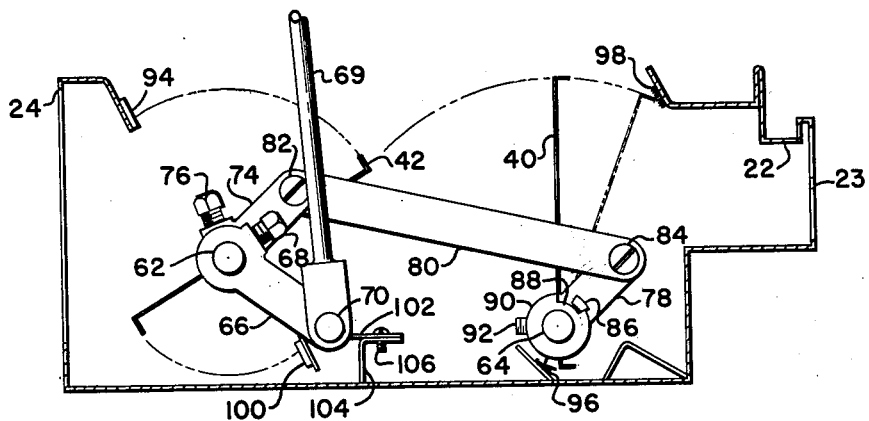
FIG. 5 is a view of the fresh and return air dampers with the associated damper mechanism shown in greater detail. The fresh and return air dampers being shown in the position when the heating and cooling apparatus is operating on approximately 75% fresh air in the winter.
Figure 6:
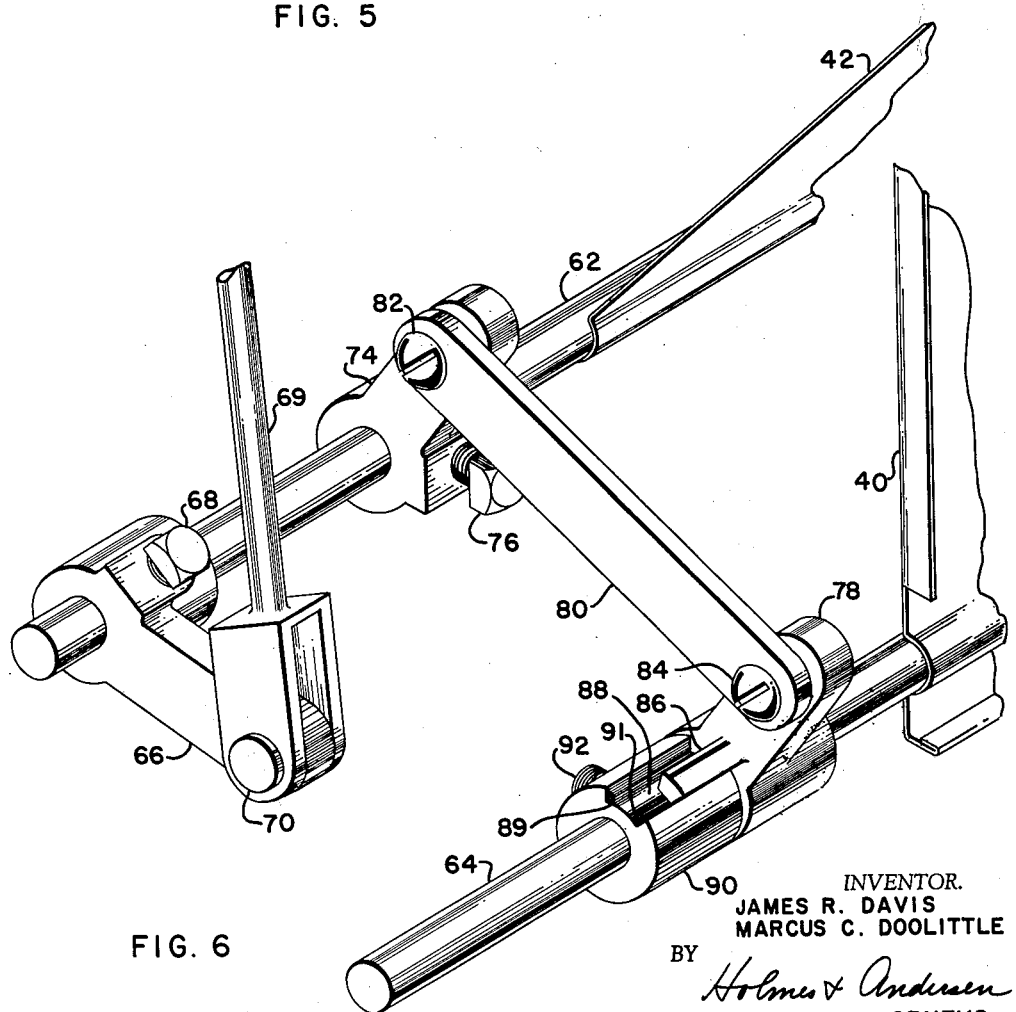
FIG. 6 is a perspective view of the fresh and return air damper linkage of FIG. 5.

In FIGS. 3, 5, and 6 there is shown the fresh air damper 42, the return air damper 40, and the linkage mechanism to link the two dampers together in order to proportion the amounts of each type of air which is delivered to the conditioned space. Fresh air damper 42 is secured to shaft 62 and return air damper 40 is secured to shaft 64. Lever arm 66 is secured to shaft 62 by a set screw 68 or any other suitable means and rotates shaft 62 when connecting arm 69 pivotally secured to lever arm 66 at 70 is actuated by damper motor 72. Another lever arm 74 is secured to shaft 62 by a set screw 76 or any other suitable means and is connected to a third lever arm 78, freely mounted on shaft 64, by a link member 80 which is pivotally mounted to lever arm 74 at 82 and to lever arm 78 at 84. A key member 86, preferably integrally formed on lever arm 78, projects into a slot 88 in collar 90 which is secured to damper shaft 64 by a set screw 92 or any other suitable means. Abutting surfaces 89 and 91 define the slot 88 which is approximately twice as wide as key member 86. Obviously, the widths of slot 88 and key member 86 may be varied for different degrees of travel and relative movement of the fresh and return air damper.

Sealing strips 94, 96, 98, and 100 are provided to seal the dampers when the dampers are abutted against them. Stop member 102 is provided to limit the closing of fresh air damper 42 and is adjustably mounted on angle member 104 by screw member 106.

Looking at FIG. 5, fresh air damper 42 is shown as approximately 75% open and return air damper 40 is approximately 25% open. This is the approximate positions of the fresh and return air dampers where a sudden gust of wind or a high wind velocity would normally cause the outside air to be blown through the fresh air inlet and into the conditioned space through the return air opening 23. We have provided collar 90 to alleviate this situation. When the dampers have reached the position shown in FIG. 5 and a gust of wind blows through the fresh air inlet, the wind will blow against return air damper 40 rotating collar 90 and shaft 64 until key member 86 abuts the surface 89 of slot 88, which is nearest the fresh air inlet, thusly closing the return air damper 40. Rotation of fresh air damper 42 to the full open position then will cause the key member 86 to rotate to abutting surface 91 which is the side of the slot 88 nearest the return air inlet 22 and lock the return air damper in the closed position.

In operation, assuming the fresh air damper 42 is fully open and the return air damper 40 is fully closed, the damper motor 72 actuates connecting arm 69 to pull the lever arm 66 upwards. The upward movement of lever arm 66 rotates shaft 62 counter-clockwise to pivot the fresh air damper towards the closed position. At the same time, lever arm 74 is rotating away from the return air damper 40 and through link arm 80 rotates lever arm 78 in the same direction. Lever arm 78 does not start to open the return air damper until key member 86 has traveled from the abutting surface 91 of the slot 88 to the abutting surface 89 of the slot 88 in collar 90. The fresh air damper has closed approximately 25% before the return air damper starts to open. If additional air is needed before the return air damper is opened by the lever arm 78, the suction of the fan is sufficient to pull the return air damper open in order to allow additional air to be directed to the heat exchangers.

After the key member 86 on lever arm 78 has contacted the abutting surface 89, the return air damper will continue to open and the fresh air damper will continue to close. After the return air damper 40 has passed a position perpendicular to the base of the unit 10, the collar 90 will rotate approximately 30° clockwise due to the weight of the return air damper 40 until abutting surface 91 of the slot 88 abuts key member 86. The fresh air damper 42 will then continue to rotate until the closed position is reached and the return air damper will rotate until the full open position is reached.

Under certain operating conditions, it has been found that the suction of the fan pulls the return air damper open as the fresh air closes thereby maintaining abutting surface 91 in contact with key member 86 until the return air damper reaches the position where it falls toward the closed position due to the weight of damper blade 42.

Conversely, when the connecting arm 69 is projected downwardly by the damper motor 72, the damper 42 will rotate towards the open position through lever arm 66 and shaft 62 and return air damper 40 will rotate towards the closed position through lever arm 66, shaft 62, lever arm 74, link 80, lever arm 78, collar 90, and shaft 64.

The above return air damper and fresh air damper interlocking linkage mechanism provides an efficient proportioning control for the air inlet system of the heating and cooling unit and further provides a unique solution for the prevention of blow through which has been a problem in the industry for a number of years. Our collar 90 allows the return air damper 40 to close if a sudden surge of air should enter the fresh air inlet 24.

*Operation*

Figure 7:
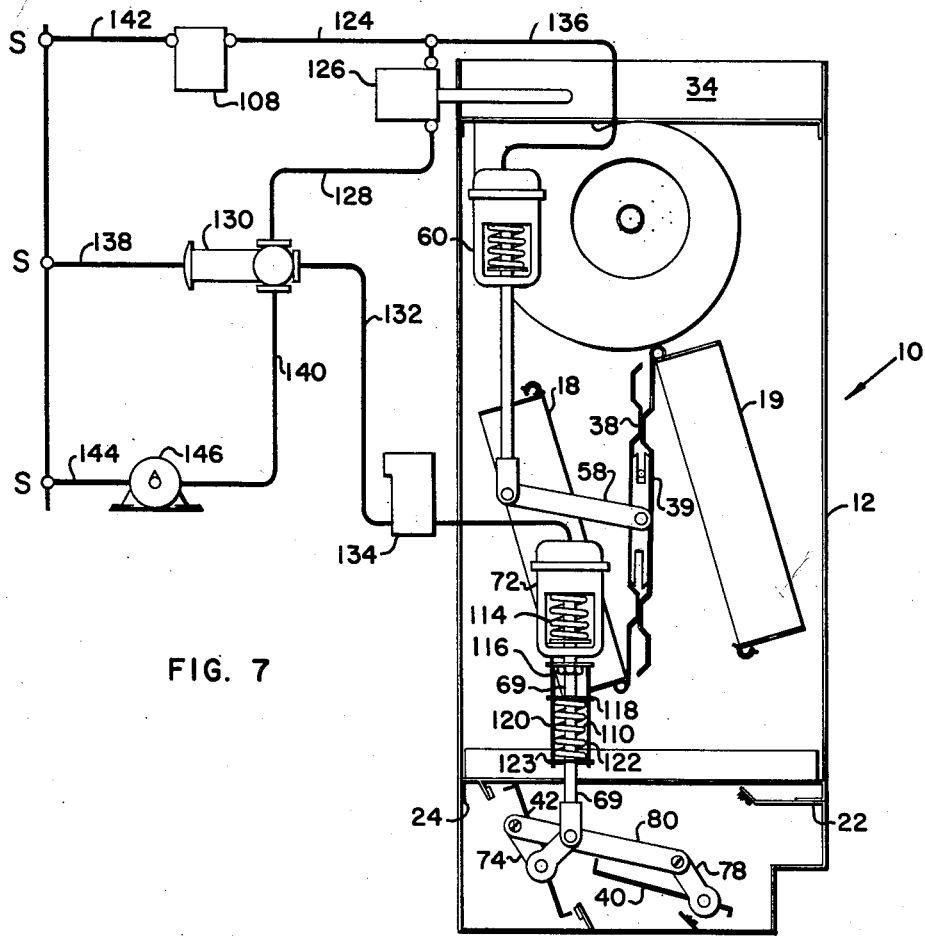
FIG. 7 is a partial schematic view of the control system and mechanism of the new and improved heating and cooling apparatus with the unit shown in the full cool position.
Figure 8:
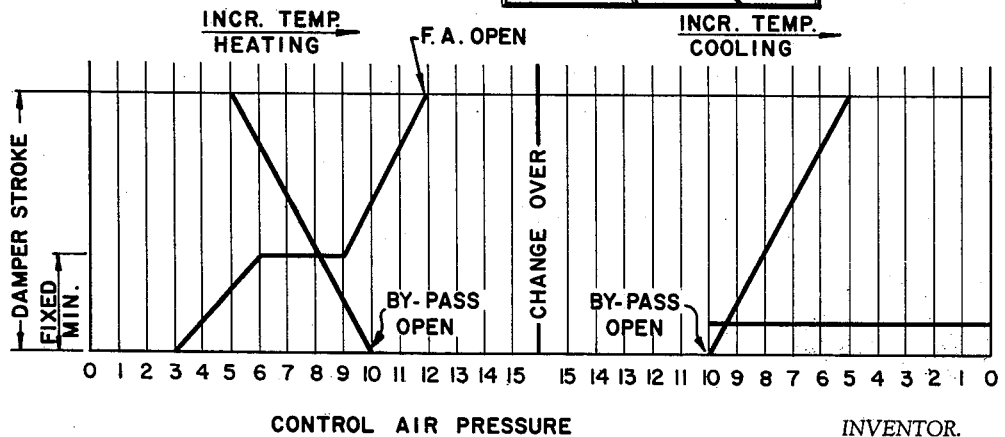
FIG. 8 is a graphical representation of the control circuit shown in FIG. 7.

FIGS. 6 and 7 show a pneumatic control for our before mentioned heating and cooling apparatus. For purposes of explanation, it will be assumed that the summer control air pressure is 10 p.s.i. and the winter control air pressure is 15 p.s.i. Other control pressures may be used, if desired. Changeover from summer to winter will be assumed to be manual and does not constitute part of the disclosed control system. Heating-cooling pneumatic thermostat 108 is direct acting during winter operation and reverse acting during summer operation. Pneumatic control is preferred but electrical control may be used, if desired.

Damper motor 60, for purposes of discussion, has a range of 5–10 p.s.i. Damper motor 72 with hesitation spring 110, for purpose of discussion, has an operating range of 3–6 p.s.i. and 9–12 p.s.i. In operation, when the air pressure reaches 3 p.s.i., damper rod 69 is forced forward against the tension of spring 114 until nut 116 secured to damper rod 112 contacts plate 118 slidably secured on rods 120, 122, and damper rod 112. Plate 118 is fixed to one end of hesitation spring 110 and the other end of hesitation spring 110 is secured to plate 123 which is secured to rods 120 and 122. In our example, nut 116 will abut plate 118 when the air pressure reaches 6 p.s.i. and will maintain the fresh air damper and return air damper in the fixed minimum position until the air pressure reaches approximately 9 p.s.i. This first position is the minimum fresh air position and spring tensions and air pressures may be used to fix this position in accordance with the minimum amount of fresh air required. As the air pressure increases above 9 p.s.i., the plate 118 will act against hesitation spring 110 and move damper rod forward until the fresh air damper is fully opened which normally will be reached when the air pressure exceeds 12 p.s.i.

Assume now that the heating and cooling unit 10 is on winter operation and that the unit has been set back for night time service, and the thermostat 108 is satisfied. In the morning, thermostat 108 is set ahead to call for heat, the room will be cool so that the thermostat passes very little control air. Fresh air damper 42 will be closed, return air damper 40 will be wide open, and bypass dampers will be in the full heat position and not allowing any air to bypass the heat exchangers. This is the warm up position and will pick up the room temperature rapidly. As the room temperature increases, thermostat 108 passes more control air through line 124, through a low limit thermostat 126, line 128, through three way valve 130 connected directly to air source S and actuated thereby when the manual winter switch is thrown, through line 132, through electric-pneumatic valve 134, and to damper motor 72. At the same time, the increasing air pressure is transmitted to damper motor 60 through conduit 136. When the air pressure reaches 3 p.s.i., the fresh air damper 42 will start to open and the return air damper 40 will start to close. As the temperature increases, more air pressure will be transmitted from thermostat 108. When the air pressure exceeds 5 p.s.i., the damper motor actuated by the air pressure will start to open the bypass dampers 38 and 39. If the temperature in the conditioned space continues to rise, the increased air pressure on the damper motor 60 will continue to open the bypass dampers until a pressure of air exceeds 10 p.s.i., at which all the incoming air is bypassing the heat exchangers. As the air pressure on the damper motor 72 is increased, the fresh air damper will open to a minimum position at 6 p.s.i. and the return air damper is closed proportionately. As the temperature continues to increase in the conditioned space, and the air pressure to the damper motor exceeds 9 p.s.i., the fresh air damper will start to open further and the return air damper will close. When the room temperature is such that the thermostat is transmitting air pressure in excess of 12 p.s.i., the bypass dampers will be wide open, the fresh air damper fully open, and the return air damper closed. Obviously, as the conditioned room temperature varies, intermediate positions of the above dampers will be maintained by modulating pneumatic thermostat 108.

Low limit thermostat 126 will cut-off the supply of control air pressure to damper motor 72 if the fan discharge temperature drops below a certain predetermined value and thereby close the fresh air damper 42 and open the return air damper 40.

Electric-pneumatic valve 134 is wired across the blower motor 16 and will cut off the control air to the damper motor 72 if the fan is not operating and thereby close the fresh air damper and open the return air damper.

Three way switch 130 is actuated directly from the main air source S via conduit 138 and positions itself either in the summer position or the winter position depending on which position is set by the manual changeover switch, not shown. In winter operation, the three way valve 130 transmits air from conduit 128 to conduit 132. In summer operation, the three way valve 130 transmits air from conduit 140 to conduit 132.

During summer operation, assuming the room conditions are satisfied and the pneumatic thermostat 108, now reverse acting, is maintaining maximum pressure, 10 p.s.i. for example, in the control system, it can readily be seen that the bypass dampers 38 and 39 will be positioned flush against the heat exchangers and bypassing all entering air. Control air from main source S feeds conduit 142, through thermostat 108, conduit 124, and through conduit 136 to damper 60. Since damper 60 has a range of 5–10 p.s.i., the bypass dampers are rotated to the full open position. Simultaneously, control air passes through line 144 from main source S, through pressure gradual switch 146, through conduit 140, three way valve 130, conduit 132, through electric-pneumatic valve 134 to damper motor 72. The fresh air damper 42 on summer operation is maintained open at a certain predetermined position. This position is obtained by setting the pressure gradual switch 146 so that only a certain predetermined amount of control pressure air is delivered to damper motor 72. As long as the main source of control pressure delivered to damper motor 72 is less than that necessary to overcome hesitation spring 110, the fresh air damper will remain in the minimum fresh air position.

The above control system and control pressures are merely exemplary. Other control systems and pressures may be used without deviating from our invention and its concept. Further, automatic cut-off valves may be incorporated in the control system in order to shut off the flow of heat exchange fluid to and from headers 148 and 150 of the heat exchangers upon bypass of all the entering air or on shut-down without deviating from the scope of the invention.

It is obvious that we have provided a heating and cooling unit which conserves floor space in the conditioned space by our decrease in depth of the unit. This savings in a large commercial building gives the owner a considerable increase of rental space. Further, our new and novel unit eliminates blow through of outside air under extreme wind conditions alleviating a decided disadvantage of comparable units. Also, our unique linkage mechanism for controlling the bypass dampers is simple, easy to install, efficient in operation, and inexpensive to manufacture.

Although we have described in detail the preferred embodiment of our invention, it is contemplated that many changes may be made without departing from the scope or spirit of our invention, and we desire to be limited only by the claims.

We claim:

1. An air conditioning apparatus comprising a casing with a top, front, two sides, and a back, air outlet means adjacent the top of said casing, air inlet means adjacent the bottom of said casing, a pair of heat exchangers mounted in said casing substantially parallel to and spaced from one another and inclined at an angle to a plane parallel to said front panel, one corner of one of said heat exchangers being adjacent said front panel and the diagonally opposite corner of said other heat exchanger being adjacent the back of said casing, means substantially sealing the space between said casing and said heat exchanger corners whereby air passing from said air inlet means to said air outlet means will pass either through the heat exchangers or through the space therebetween, air moving means between said air inlet means and said air outlet means for circulating air through said air inlet means and out said air outlet means, and bypass damper means operably associated with said heat exchangers to bypass the incoming air so that the incoming air does not pass through the heat exchangers and to direct the bypass air through the space between said heat exchangers.

2. An air conditioning apparatus comprising; a casing with a top, front, two sides, and a back, air outlet means adjacent the top of said casing, air inlet means adjacent the bottom of said casing, a pair of heat exchangers mounted in said casing substantially parallel to and spaced from one another and inclined at an angle to a plane parallel to said front panel, one corner of one of said heat exchangers being adjacent said front panel and the diagonally opposite corner of said other heat exchanger being adjacent the back of said casing, means substantially sealing the space between said casing and heat exchanger corners whereby air passing from said air inlet means to said air outlet means will pass either through the heat exchangers or through the space therebetween, air moving means between said air inlet and said air outlet means for circulating air through said air inlet means and out said air outlet means, a pair of dampers rotatably secured in said casing between said heat exchangers, and means to rotate said dampers to a position substantially flush with said heat exchangers whereby the incoming air will bypass said heat exchangers and pass through the space therebetween under certain predetermined room conditions and to rotate said dampers to a position substantially flush with one another whereby the incoming air will pass through said heat exchangers under other certain predetermined conditions.

3. An air conditioning apparatus comprising; a casing with a top, front, two sides, and a back, air outlet means adjacent the top of said casing, air inlet means adjacent the bottom of said casing, a pair of heat exchangers mounted in said casing substantially parallel to and spaced from one another and inclined at an angle to a plane parallel to said front panel, one corner of one of said heat exchangers being adjacent said front panel and the diagonally opposite corner of said other heat exchanger being adjacent the back of said casing, means substantially sealing the space between said casing and said heat exchanger corners whereby air passing from said air inlet means to said air outlet means will pass either through the heat exchangers or through the space therebetween, air moving means between said air inlet and said air outlet means for circulating air through said air inlet means and out said air outlet means, a pair of dampers rotatably secured in said casing in the space between said heat exchangers, U-shaped members attached to said dampers, damper shaft means extending between said dampers, bracket member secured to said damper shaft means, said bracket members having slots therein slidably engaging at least one of said U-shaped members on each damper, and means to rotate said damper shaft in one direction to open said dampers to bypass the incoming air so that it passes through the space between said heat exchangers and to rotate said dampers to closed position to block the space between said heat exchanger so that the incoming air passes through the heat exchangers.

References Cited in the file of this patent

UNITED STATES PATENTS

| Re. 19,260 | Shurtleff | July 30, 1934 |
|---|---|---|
| 1,719,659 | Hopkins | July 2, 1929 |
| 1,990,468 | Bridges | Feb. 12, 1935 |
| 1,990,895 | Callahan | Feb. 12, 1935 |
| 2,220,355 | Shurtleff | Nov. 5, 1940 |
| 2,720,151 | Kreuttner | Oct. 11, 1955 |
| 2,909,043 | Baker et al. | Oct. 20, 1959 |
| 2,913,229 | Hood et al. | Nov. 17, 1959 |